March 25, 1924.
W. G. BURNS
MOVABLE GATE FOR BINS AND THE LIKE
Filed Aug. 15, 1923
1,488,229
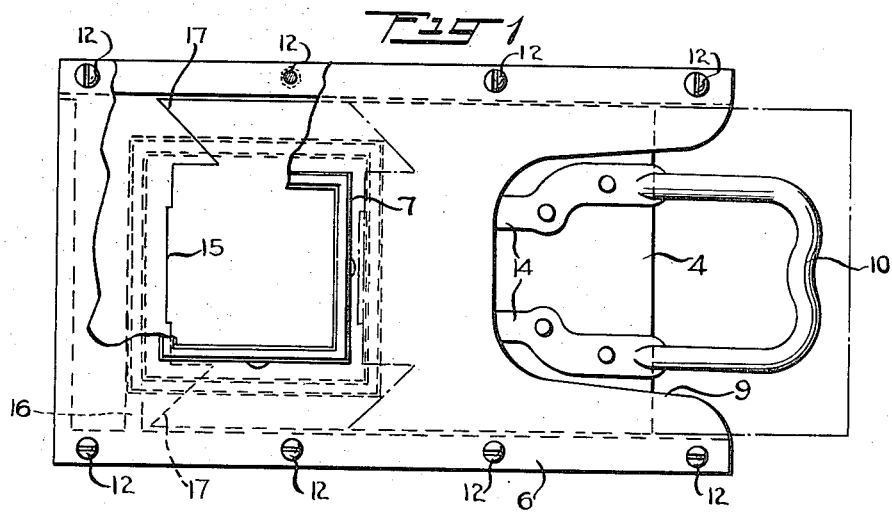
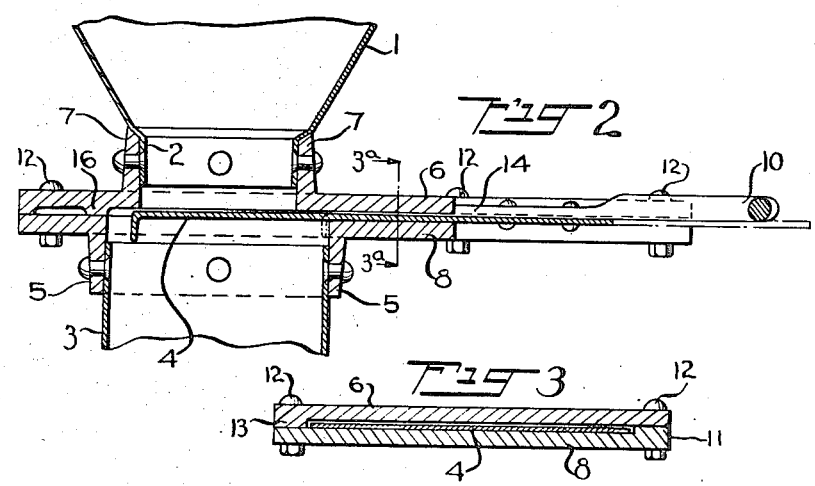
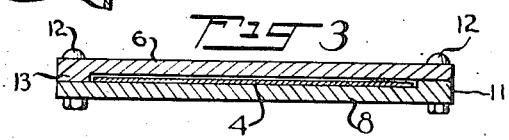
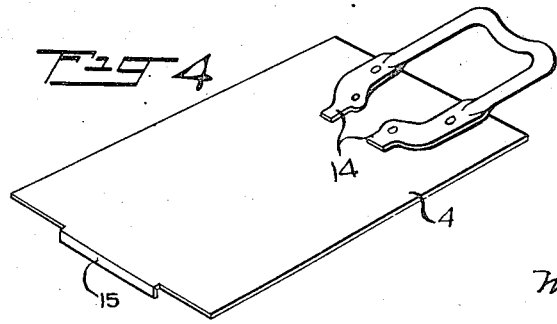
INVENTOR
William G. Burns
BY
ATTORNEY Patented Mar. 25, 1924.

1,488,229

UNITED STATES PATENT OFFICE.

WILLIAM G. BURNS, OF NEW YORK, N. Y., ASSIGNOR TO JABEZ BURNS & SONS, OF NEW YORK, N. Y., A CORPORATION OF NEW YORK.

MOVABLE GATE FOR BINS AND THE LIKE.

Application filed August 15, 1923. Serial No. 657,507.

*To all whom it may concern:*

Be it known that I, WILLIAM G. BURNS, a citizen of the United States, and a resident of New York, in the county of New York and State of New York, have invented certain new and useful Improvements in Movable Gates for Bins and the like, of which the following is a specification.

This invention relates to slidable gates adapted to control the flow of comminuted materials, such as grains, coffee, sugar, meal, and the like, through a passageway, such for example as a chute between a bin and delivery pipe as described in the patent to Schnuck #1,189,003 dated June 27, 1916, on which the present invention is an improvement.

An object of this invention is to provide a structure containing a gate which will not spill any of the material outside the passageway during its sliding movement, and which will prevent the material clogging the guideway in which the gate slides. A further object is to provide a device applicable to existing bins, feed piping to packaging machines, warehouses and the like.

Gates of the type described in the above patent tend to push small amounts of material through the opening in the rear of the gate. This difficulty is eliminated by providing an end cut-off gate, and in conjunction therewith is preferably provided means causing the gate to clear the guideway of accumulated material, and stopping means to prevent complete withdrawal.

In the drawings,

Fig. 1 is a plan view of the mechanism embodying this invention,

Fig. 2 is a vertical section through the device of Fig. 1,

Fig. 3 is a section on the line $3^a$—$3^a$ of Fig. 2,

Fig. 4 is a perspective view of the gate alone.

The bottom portion of a bin, hopper, or the like, for containing material such as grain, coffee, sugar, meal, or similar materials, is represented by the numeral 1 as being provided with a chute or opening 2. The top of a delivery pipe or passageway is represented by the numeral 3, into which the material is to be discharged, the discharge being controlled by the slidable gate 4 to close the opening 2. The gate slides between a pair of apertured plates 6 and 8, each provided with flanges 7 and 5 respectively, to which the hopper and delivery pipe are connected as illustrated. The bottom plate 8 has a flat face on which the gate 4 slides and both the upper and lower plates are preferably cut in as at 9 to receive the handle 10 of the gate when the latter is closed so that the handle will not project too far outside the apparatus with which the gate is associated.

Plates 6 and 8 as herein shown are provided with continuous lugs 13 and 11 on opposite sides so that when the plates are secured together by the bolts 12 a guideway or slide is provided for the gate, it being seen that the gate is supported by the lower plate 8 and disposed close to the lower face of the upper plate 6 so that an accurate closing of the passage is effected by the gate. The handle 10 is preferably provided with lugs 14 which act as stops against the cut away portion of the upper plate to limit the inward or closing movement of the gate as shown in Fig. 1, while the gate is provided with a stop lug 15 which engages one side of the delivery pipe or collar 5 to limit the opening movement.

The lug 15 may also be used to limit the closing movement of the gate should it be desired to do away with the lugs 14 on the handle. As shown in Fig. 2, the upper plate is provided with another lug 16 of the same height as 13 but arranged transversely thereto for the purpose of closing the inner end of the guideway in which the gate slides, said lug being substantially flush with the inner wall of the collar 5 or delivery pipe. The delivery pipe 3 may be attached on the outer or inner side of collar 5 and the opening in the lower plate 8 is larger than the opening in the upper plate 6 so that material once passing the gate will fall freely without being caught in the guideways. It will be seen that the gate is supported on its opposite sides so that it will carry the weight of material in the hopper 1 without deflection and will also be easily movable. By cutting the plates 6 and 8 as at 9 the gate can be shortened in over-all length and the handle 10 will slide between the extensions formed by cutting in the top and bottom plates as shown.

From Fig. 1 it will be seen that the opposite sides of the gate are provided with scraping means 17 so that as the gate is closed any material in the guideways is swept into the large opening of the delivery pipe and therefore there is no likelihood of the gate becoming jammed.

Figure 4 illustrates a gate similar to that shown in Figures 1 and 2 except that the scraping portions 17 are not arranged at an angle, but are substantially normal to the sides of the gate.

Among the advantages of this invention may be mentioned its adaptability to slide easily and especially the freedom from any material being pushed out from between the plates as the gate is either opened or closed. The lug 16 closes the inner end of the guideway in which the gate slides and therefore prevents any material which may clog the guideway being forced out as the gate closes. The use of a large opening in the lower plate for the delivery pipe is one feature which contributes to the elimination of material clogging the guideway but in some cases such as when the delivery pipe may be filled with material above the guideway and there is an opportunity for the material to clog the sides of the guideway the gate pushes any such collected material out of the guideway during closing into the pipe 3. Especially is this true of the embodiment illustrated in Fig. 1 wherein the gate has its opposite side end portions inclined so as to sweep any collected material out of the guideway after the manner of a plow. The lug 15 may limit either the outward or inward movement of the gate by its engagement with the opposite sides of the delivery pipe or collar portion 5 in the lower plate and hence the gate may be of less length than those forms of sliding gate having an opening therein. Inward movement of the gate may be stopped by lugs 14 or by the lug 15, or by the rear ends of the scraping portions 17 cooperating with the lug 16 closing the end of the guideway, or by any two or more of these means. When coarse material passes through the chute and delivery pipe there is less likelihood for any material collecting in the guideway than when very finely divided particles pass through the chute, or when the delivery pipe may become filled above the level of the guideway. The scraping means 17, provided at the sides of the gate, extends from one side inwardly to just beyond the large aperture in the delivery pipe and not as far as the aperture in the chute. This scraping means is not limited to use with gates of the imperforate or end cut-off type. Movement of the gate causes none of the material from the guideway or elsewhere to be dropped outside the chute and delivery pipe as did some of the formerly used gates.

I claim:

1. The combination with a chute, of a guideway closed at one end and extending across said chute, a delivery pipe larger than said chute, a substantially rectangular gate slidable in the guideway for controlling the chute and delivery pipe, said gate being shaped at its forward corners to clear the guideway of any material tending to pack therein and provided with means for engagement with the inside of the delivery pipe opposite the closed end of said guideway to limit the opening movement thereof.

2. A gate mechanism for a bin or the like comprising an upper plate having an aperture and an upwardly extending flange flush with said aperture, a lower plate having an aperture larger than said upper aperture and a downwardly extending flange flush with said lower aperture, means holding said plates together and leaving a guideway between them closed at one end substantially flush with one side of said lower aperture and downwardly extending flange, extensions on opposite edges of each of said plates forming an extension for said guideway, a substantially rectangular gate sliding between said plates, a handle on said gate located between said extensions and adjacent said plates when said gate is in closed position, and means on said gate for co-operation with an inner side of said larger aperture and downwardly extending flange to limit the opening movement after said gate is completely open.

Signed at New York, in the county of New York and State of New York, this 13th day of August, A. D. 1923.

WILLIAM G. BURNS.